US008951332B2

(12) United States Patent  (10) Patent No.: US 8,951,332 B2
El-Safty et al.  (45) Date of Patent: Feb. 10, 2015

(54) METHOD FOR COLLECTING CO FROM URBAN ORE

(75) Inventors: Sherif El-Safty, Ibaraki (JP); Ahmed Shahat Ahmed, Ibaraki (JP); Kohmei Halada, Ibaraki (JP)

(73) Assignee: National Institute for Materials Science, Ibaraki (JP)

( * ) Notice: Subject to any disclaimer, the term of this patent is extended or adjusted under 35 U.S.C. 154(b) by 231 days.

(21) Appl. No.: 13/522,833

(22) PCT Filed: Jan. 19, 2011

(86) PCT No.: PCT/JP2011/050899
§ 371 (c)(1),
(2), (4) Date: Oct. 4, 2012

(87) PCT Pub. No.: WO2011/090086
PCT Pub. Date: Jul. 28, 2011

(65) Prior Publication Data
US 2013/0036870 A1    Feb. 14, 2013

(30) Foreign Application Priority Data

Jan. 19, 2010 (JP) ................................. 2010-008692

(51) Int. Cl.
C22B 23/00 (2006.01)
B01D 15/00 (2006.01)
(Continued)

(52) U.S. Cl.
CPC . B01D 15/00 (2013.01); C22B 3/24 (2013.01); B01J 20/28064 (2013.01);
(Continued)

(58) Field of Classification Search
CPC .............................. C22B 3/0098; B01J 20/103
USPC ..................................... 75/738, 711; 502/407
See application file for complete search history.

(56) References Cited

U.S. PATENT DOCUMENTS

| 4,426,225 A | * | 1/1984 | Ida et al. .......................... 75/715 |
| 5,779,906 A | * | 7/1998 | Tavlarides et al. ............. 210/661 |
| 6,264,720 B1 | * | 7/2001 | Schowanek et al. ............ 75/300 |

FOREIGN PATENT DOCUMENTS

| JP | 7-112128 | 5/1995 |
| JP | 2009-247981 | 10/2009 |
| WO | 96/09885 | 4/1996 |

OTHER PUBLICATIONS

Gennaro et al., Immobilized Ligands on Silica: Uptake of Cobalt and Other Metals by 1-Nitroso-2-Naphthol, 1986, Polyhedron, vol. 5, No. 4, 1013-1015.*

(Continued)

*Primary Examiner* — Kaj K Olsen
*Assistant Examiner* — James Fiorito
(74) *Attorney, Agent, or Firm* — Wenderoth, Lind & Ponack, L.L.P.

(57) ABSTRACT

Urban ore is a mixture of a lot of metallic elements, and these metallic elements need to be separately collected therefrom. However, because the content of each metallic element is very small, it has been extremely difficult to selectively collect the required metallic element.

In order to solve the problem, there is provided a metal-ion adsorbent which is for use in a method for collecting metal ions present in a liquid, and in which a continuously porous support having large numbers of pores of uniform size and shape, and a compound having a metal ion-binding group is chemically bonded to the inner surfaces of the pores, whereby a material and a method with which rare-metal ions contained in urban ore are efficiently and inexpensively taken out are provided.

6 Claims, 4 Drawing Sheets

(51) Int. Cl.
*C22B 3/24* (2006.01)
*B01J 20/28* (2006.01)
*B01J 20/32* (2006.01)
*B01J 20/34* (2006.01)

(52) U.S. Cl.
CPC ......... *B01J 20/3204* (2013.01); *B01J 20/3246* (2013.01); *B01J 20/3251* (2013.01); *B01J 20/3433* (2013.01); *B01J 20/3483* (2013.01); *B01J 20/28042* (2013.01)
USPC ............................... 75/738; 75/711; 502/407

(56) References Cited

OTHER PUBLICATIONS

International Search Report issued Apr. 26, 2011 in International (PCT) Application No. PCT/JP2011/050899, of which the present application is the national stage.
El-Safty, "Organic-inorganic hybrid mesoporous monoliths for selective discrimination and sensitive removal of toxic mercury ions", Journal of Materials Science, vol. 44, No. 24, pp. 6764-6774, 2009.

* cited by examiner

METHOD FOR COLLECTING CO FROM URBAN ORE

TECHNICAL FIELD

The present invention relates to methods for collecting Co from urban ore.

BACKGROUND ART

There is a rapidly increasing global demand for metals, particularly rare metals, contained in products such as cell phones and personal computers. However, reserves and production of rare metals are small, and because countries having reserves of these resources are limited, rare metals are subject to rapid price fluctuations, and are politically controlled by countries having these resources. It has thus become very important to keep a stable stock of rare metals. On the other hand, the amounts of wastes of cell phones, personal computers, and other products using rare metals have been increasing sharply, and there is an urgent need for collecting rare metals from these wastes. Such wastes containing rare metals and noble metals are sometimes called urban ores. However, the urban ores are a mixture of a lot of metallic elements, and these metallic elements need to be separately collected. Because the content of each rare metallic element is very small, it has been extremely difficult to selectively collect the desired metallic element with the conventional smelting technique.

SUMMARY OF THE INVENTION

Problems to be Solved by the Invention

It is an object of the present invention to provide a Co ion collection method of collecting only the desired Co element from a mixture of metallic elements in urban ores, and a metal collection method using the same.

Means for Solving the Problems

The present invention is a method for selectively collecting the specific metal Co from an urban ore obtained by comminuting an electronic device waste and containing Co, the method including: a first step of immersing the urban ore in a nitric acid aqueous solution to elute the Co metal contained in the urban ore, and mixing a Co ion adsorbent with the resulting Co ion-containing liquid; a second step of separating the Co ion adsorbent from the liquid after the Co ions are adsorbed; a third step of introducing the Co ion adsorbent separated in the second step into a collection liquid that does not contain Co ions, and separating and releasing the Co ions into the collection liquid;

a fourth step of separating the Co ion adsorbent from the collection liquid after the Co ions are released; and a fifth step of removing the liquid component of the collection liquid from which the Co ion adsorbent is removed in the fourth step, so as to collect the Co contained in the collection liquid, the Co ion adsorbent mixed with the Co ion-containing liquid in the first step including a support having a continuously porous mesoporous structure formed of large numbers of pores of substantially uniform size and shape; and a compound that has a metal ion-binding group and is chemically bound to inner surfaces of the pores.

It is preferable in the invention that the Co ion adsorbent separated from the collection liquid in the fourth step be reused as a Co ion adsorbent in the first step, and that the Co ion-containing liquid used in the first step be one after the separation of the adsorbent in the second step and in which the Co ions still remain.

It is also preferable in the Co ion adsorbent that the support and the compound be bound to each other via a OH group, that the support be a HOM silica having a high-order porous structure, that the support be a HOM silica prepared in a sol-gel reaction from a system including an organosilicon compound and a surfactant, and that the support be a HOM silica prepared in a sol-gel reaction from a system including an organosilicon compound, a surfactant, and an alkane.

It is also preferable in the Co ion adsorbent that the compound having a Co ion-binding group is a chelate compound.

Advantage of the Invention

The present invention enables accurate collection of Co metal ions—a valuable resource from urban ore, yet has not been considered or used—through chemical adsorption and separation. This has made it possible to save resources for the collection of Co from urban ore.

MODE FOR CARRYING OUT THE INVENTION

Figure 1:
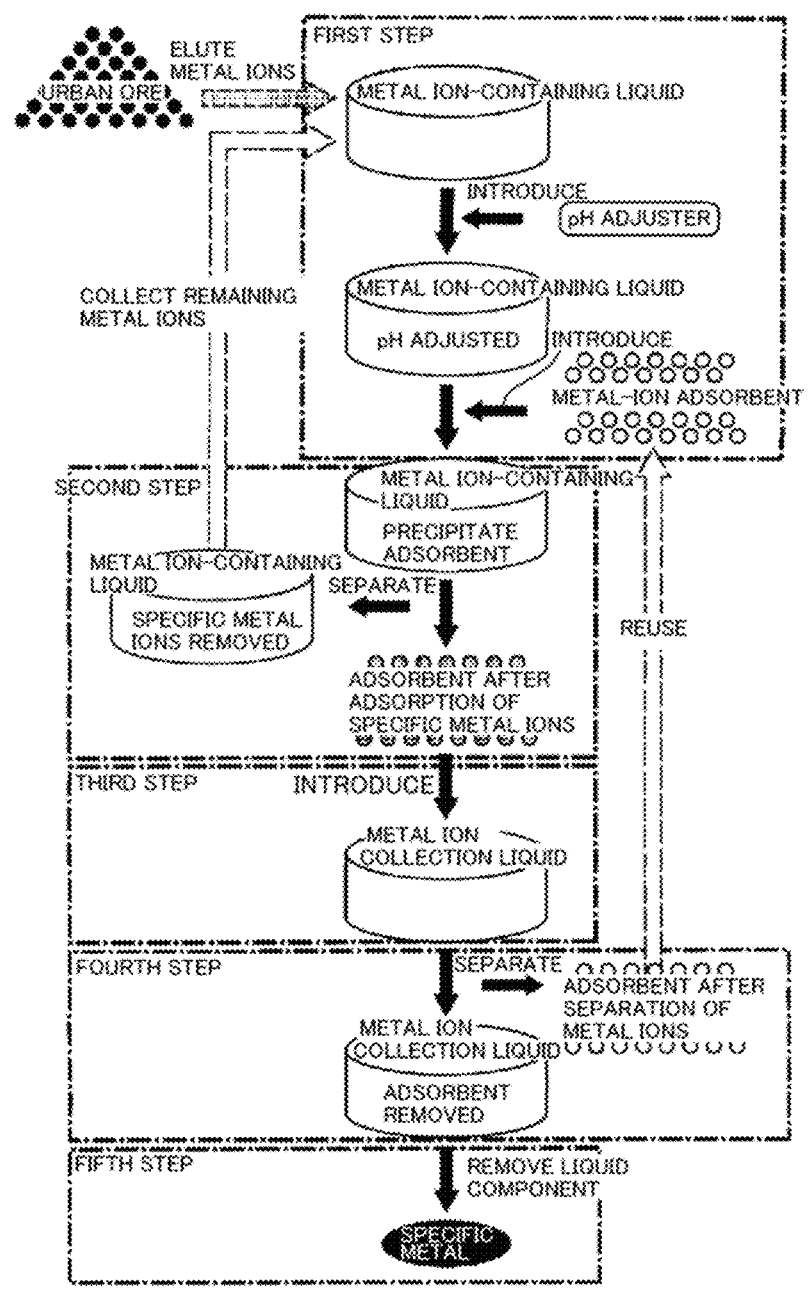
FIG. 1 is a step diagram representing an exemplary system configuration of a Co collection method of the present invention.

Mesoporous constructions, specifically, the mesoporous silica described in Examples below, and constructions, such as aluminum oxide and nickel oxide, having a mesoporous structure and preferred as a support have been recently developed by National Institute for Materials Science and other institutions.

For example, "mesoporous silicate and method of production thereof" (JP-A-2004-35368; National Institute for Materials Science), and "mesoporous solid producing method" (JP-A-10-226514; The Max Planck Institute) are available.

Applicants of the present application also have been conducting studies directed to controlling the pore size of mesoporous constructions and providing uniform mesoporous structures, along with studies concerning applications of materials for the detection of metal ions with specific dye molecules. For example, "ion sensor and ion detection method" (JP-A-2007-327887; National Institute for Materials Science), "chemical sensor material" (JP-A-2008-224461; National Institute for Materials Science), and "hexavalent chromium quantification method in water" (JP-A-2007-327886; National Institute for Materials Science) are available.

This application of the present invention is intended to prepare a superior Co ion adsorbent by using the mesoporous construction, and realizes a method for collecting Co from urban ore by using the Co ion adsorbent.

[Preparation of Metal-Ion Adsorbent]

The Co ion adsorbent used in the present invention is based on the findings from the previous research and development by the present inventors, and uses a mesoporous construction as a preferred embodiment. The mesoporous structure is a type of porous structure, and has large numbers of fine pores (mesopores) of uniform and highly ordered size and shape.

The mesoporous structure belongs to a group of porous substances known to exhibit various properties depending on the fine pore network patterns (spatial symmetry), and the method of production. The mesoporous structure tends to occur in fine pores having a 2 to 50 nm-diameter region called a mesopore region. However, in this specification, the term "mesoporous structure" or "mesoporous construction" is used as being inclusive of structures having micropores (fine pores less than 2 nm) smaller than the mesopores, and macropores (fine pores exceeding 50 nm) larger than the mesopores.

Specifically, a continuously porous mesoporous construction formed of large numbers of pores of substantially uniform size and shape is one having a highly uniform overall structure, including structures that primarily include fine pores of 2 to 50 nm diameters, and that partially include micropores (fine pores less than 2 nm) smaller than the mesopores, and macropores (fine pores exceeding 50 nm) larger than the mesopores.

The phrase "highly ordered", it means a state of a cubic or hexagonal mesoporous structure three-dimensionally arranged on the surface or on the inner wall surface in an orderly fashion. Examples include cubic Ia3d, Pm3n, and Im3m structures, and a hexagonal P6m structure. With these structures present over a wide range, a compound can be supported in large quantity, and the total metal ion adsorption amounts can be increased.

The term "high ordered mesoporous", or more commonly, "HOM" used in the context of a porous support having such structures generally does not encompass silica. In this specification, however, the term "HOM" is used as being inclusive of silica, unless otherwise stated.

The HOM form includes a thin-film form and a monolith form. The monolith form typically refers to forms other than the thin film, including, for example, fine particles, particles, and blocks. The HOM BET specific surface area should be as large as possible, and is typically 500 m$^2$/g or more, preferably 800 m$^2$/g or more.

The Co ion adsorbent used in the present invention includes a compound that has a Co ion-binding group (hereinafter, such a compound is referred to as "probe"), and that is chemically bonded to the inner surfaces of the HOM fine pores.

In this way, liquid can enter every one of the fine pores because of the uniformity of the HOM fine pores, and, because the distance between the central portion where the liquid entered and the binding group is constant, the Co ions in the liquid can be adsorbed in the same probability for all fine pores.

Further, at a nano-level diameter, all the Co ions in the liquid can be expected to contact with the binding group. This enables the adsorption of low-concentration Co ions, considered impossible with the conventional techniques.

Further, because the HOM and the probes are integrated by the chemical bonding, the HOM does not easily separate from the compound even under an applied physical force, and only the Co ions can be collected by separating the adsorbed Co ions by a chemical treatment that does not affect the chemical bonding.

Specifically, the Co ions can be collected without inclusion of the adsorbent component.

Further, the adsorbent after the separation of the Co ions returns to a state before use, there is no problem in reusing the adsorbent for the adsorption of Co ions.

In the Examples below, the HOM silica is bound to the probes via a OH group. However, a known chemical bonding structure may be appropriately selected and applied according to the HOM material and the type of compound.

Because the chemical bonding cannot be broken unless being chemically acted upon to break the bond, only the Co ions can be targeted not only for the adsorption but for the separation. Thus, the Co ions can be collected with fewer disturbances while allowing reuse of the adsorbent.

Note that the probes may be those having a binding group capable of adsorbing the Co ions to be collected, and that can chemically bind to the HOM inner surface.

For example, chelate compounds may be used. Examples include α-nitroso-β-naphthol.

Because the chelate compound is capable of selectively adsorbing a very trace amount of metal (for example, on the ppb order), the method for collecting Co from urban ore according to the present invention helps exhibit such a desirable property, and thus enables the target Co ions to be efficiently and selectively adsorbed even when the target Co ions are contained in the liquid in small amounts.

For example, as will be described in Examples, 2-nitroso-1-naphthol ($C_{10}H_7NO_2$, hereinafter, "NN") preferentially adsorbs the specific rare metal cobalt $Co^{2+}$.

NN has the structural formula in which the nitroso group (—N=O) and the hydroxyl group (—OH) are attached to a benzene ring. As will be described later, when immersed in a $Co^{2+}$-containing liquid adjusted to a pH of about 7, NN adsorbs $Co^{2+}$ in greater quantities than in a solution brought to other pH values.

NN turns brown as it successively adsorbs increasing amounts of $Co^{2+}$. (Note that α-nitroso-β-naphthols such as 1-nitroso-2-naphthol also have the same properties.)

Other chelate compounds also adsorb Co ions with the adjusted pH values. For example, pyrogallol red selectively well adsorbs $Co^{2+}$ ions at pH 3.5.

8-(4-n-Dodecyl-phenylazo)-2,4-quinolinediol selectively well adsorbs $Co^{2+}$ ions at pH 5.0. Examples of other chelate compounds considered herein include one or more compounds selected from diphenylcar-bazide, dithizone, tetraphenylporphine tetrasulfonic acid, tetraphenylporphine tetrasulfonic acid, 4-n-dodecyl-6-(2-pyridylazo)phenol, δ tetrakis(1-methylpyridinium-4-yl)porphine p-toluene sulfonate, 4-n-dodecyl-6-(2-thiazolylazo)resorcinol, 8-(4-n-dodecyl-phenylazo)-quinoxaline, and 4-n-dodecyl-6-(2-)phenol.

Various methods are available for the binding of the probes to HOM (modification; also referred to as complexing method). For example, when the probes to be held by HOM are neutral, a reagent impregnation method (for example, REACTIVE & FUNCTIONAL POLYMERS, 49, 189(2001)) is used. A cation exchange method and an anion exchange method are used for anionic probes and cationic probes, respectively. These complexing methods do not involve specific conditions or procedures, but rather belong to the field commonly known in the art. Accordingly, details of such common technical fields can easily be found, for example, in reviews and literatures related to the field of solid adsorption.

Specifically, the following methods can easily be performed.

1) A HOM silica is surface-treated with an organic reagent, such as a cationic silylating agent, to give a cationic functional group to the HOM silica. The cationic HOM silica is then contacted with an aqueous solution or an alcohol solution of anionic probes to adsorb the probes in the HOM silica.

2) A HOM silica is contacted with a probe organic solvent solution, and only the organic solvent is removed to physically adsorb and support the probes in the HOM silica.

3) A HOM silica is surface-treated with a silylating agent that has a thiol group, and the thiol group is subjected to oxidation treatment to give an anionic functional group to the HOM silica. The anionic HOM silica is then contacted with an aqueous solution of cationic probes to adsorb the probes in the HOM silica.

4) Probes are loaded into the fine pores and on the surface in advance, and treated with an organic solvent solution of a cationic organic reagent to immobilize the probes in the fine pores and on the surface.

5) Probes are mixed with a cationic organic reagent in advance, and the resulting reagent complex organic solvent solution is contacted with the silica. Then, only the organic solvent is removed by a method such as filtration or distillation to support the probes in the silica.

In order to support NN on HOM as the probe, NN is dissolved in ethanol, and this solution is contacted with HOM to impregnate HOM with NN. This completes a HOM supporting the NN in high density in an orderly fashion.

HOMs having a higher order of its crystalline structure and having a greater porous (fine pore) density with a larger BET specific surface area can support more probes on the HOM surface and on the inner walls of the fine pores in an orderly fashion. For example, HOMs having structures such as the cubic structures Pm3n, Fm3m, and Ia3d, and the hexagonal structure P6m over a wide range can preferably be used to adsorb the probes.

This is because, since the chemical attribute of the HOM pore inner surface is orderly, the probes are orderly arranged in conformity with the orderliness of the pore inner surface when the probes are chemically bonded in a state that conforms to the attribute.

Further, the probes may be bonded to the HOM silica via a OH group.

With the probes alone, the Co ions can be collected only in numbers below the quantity expected from the amount of the probes used, because the probes aggregate in the liquid and the aggregates interfere with the contacting of the Co ions and the Co ion-binding groups present inside the aggregates, and because the Co ions cannot be easily separated even when adsorbed inside the aggregates. Further, the aggregates make complete separation of the adsorbed Co ions difficult, and may lower collection efficiency.

On the other hand, in the Co ion adsorbent preferably used in the present invention, every probe molecule can be used for the Co ion adsorption. The Co ion-containing liquid easily enters the fine pores of the mesoporous structure, and thus easily and quickly contacts with the probes (reaction groups of the probes) supported on the HOM. In the reverse direction liberating the adsorbed Co, the Co ions quickly contact with the liberating component, and become free without being left behind.

For example, in the case of the chelate resin alone, not all surface atoms on the surface of the chelate resin do not effectively assume the state of bearing the chelate (adsorption group), and, atomically speaking, the reactive ends of the chelate are discretely present. It is therefore not possible to control which part of the chelate resin binds to the Co ions when the chelate resin is used alone for the adsorption of the Co ions. Further, while it is expected that the Co ions are adsorbed (or extracted) on a part of the chelate functional group that comes into contact with the Co ion-containing liquid, it is conceivable that hardly any Co ions are adsorbed inside the chelate resin to which the Co ion-containing liquid does not easily permeate. That is, Co ion adsorption efficiency is very poor. It is also difficult to take out the Co ions adsorbed inside the chelate resin when liberating (or back extracting) the Co ions adsorbed in the chelate resin. Further, in the repeated use of the chelate resin, the efficiency of Co ion adsorption and the efficiency of Co ion separation and collection (extraction-back extraction) progressively worsen by the adverse effects of residues or the like in the chelate resin. The repeated use thus greatly degrades the performance of the chelate resin.

With the Co ion adsorbent preferably used in the present invention, a chelate functional group with a large actual reaction area can be formed on the HOM surface by using the large specific surface area and the orderly atomic arrangement of the HOM, even when such chelate resin (monomers or oligomers) is used and supported on the HOM.

In other words, the reactive ends of the chelate have substantially the same attribute in the HOM. Further, the chelate reactive ends are present on the HOM surface and on the inner walls of the fine pores in large numbers that cannot be achieved with the conventional chelate resin alone. Because the chelate functional groups selectively adsorb the Co ions or chelated ions, the Co ion adsorption efficiency can be greatly improved. It is also possible to take out the adsorbed Co ions by back extraction. When the chelate resin is used alone, the repeated use of the chelate resin leads to large degradation because of the lack of physical and/or chemical strength in the resin itself. On the other hand, the degradation caused by repeated use is smaller in the chelate resin supported on HOM, because the backbone HOM provides sufficient physical and/or chemical strength.

The following describes a method for collecting the valuable metal Co from urban ore according to the present invention, in which the Co ion adsorbent above is preferably used.

The present invention disclosing a method for collecting the valuable metal Co from urban ore is novel, and has a distinct inventive step neither suggested nor anticipated from the prior art.

[Co Collection Method from Urban Ore]

The method of the present invention provides a novel means for the separate collection of Co ions, and can effectively be used for the collection of the rare metal Co from urban ore.

In the method of the present invention, the urban ore obtained by comminuting an electronic device waste is first immersed in a nitric acid aqueous solution to prepare a Co ion-containing liquid of Co eluted from the urban ore. This can be performed as follows.

When materials from cell phones and personal computers containing Co are immersed in a nitric acid aqueous solution, large numbers of metals such as Fe and Cu (also contained in the urban ore) dissolve out with Co, and the undissolved components remain as solid components. Removing these solid components by filtration gives a Co ion-containing liquid.

The Co ion-containing liquid is subjected to specific treatments in steps.

The Co collection method as a preferred embodiment of the present invention is described below step by step, with reference to the step diagram shown in FIG. 1.
<First Step>
A pH adjuster is injected to the Co-containing metal ion-containing liquid to set a pH as determined by the configuration of the Co ion adsorbent, and the type of the Co ions to be collected.

The Co-ion adsorbent is then introduced into the Co-containing metal ion-containing liquid, and stirred and mixed at a maintained temperature appropriate for adsorption. As a result, only the desired Co ions selected by the pH and the configuration of the Co ion adsorbent are adsorbed by the adsorbent.

Any pH adjuster may be used, provided that it can adjust the liquid pH without inhibiting the binding of the Co ion probes and HOM, and the binding of the probes and the Co ions to be collected.
<Second Step>
Because the adsorbent for the specific metal Co ions after adsorbing the Co ions in the first step precipitates in the liquid, the adsorbent is separated from the liquid by using a filtration device or the like.
<Third Step>
The Co ion adsorbent separated in the second step has the Co ions attached thereto. The Co ion adsorbent is thus introduced in a collection liquid containing a chemical for separating the Co ions. As a result, the Co ions adsorbed by the Co ion adsorbent are separated, and released into the collection liquid.

The chemical used for the separation in the collection liquid is preferably a chemical that can separate the Co ions from the probes without inhibiting the binding of the probes and HOM, and that dissipates, for example, by being decomposed during the heat evaporation of the collection liquid.
<Fourth Step>
The Co ion adsorbent (solid component after the separation of the metal ions) is separated from the collection liquid by using a filtration device or the like.
<Fifth Step>
The collection liquid after the removal of the Co ion adsorbent in the fourth step is subjected to, for example, heat evaporation or vacuum evaporation to remove the liquid component. As a result, the Co component remains.

The Co component can then be melted to produce, for example, an ingot, which can then be reused.

In this manner, Co ions can be collected in high purity even from the liquid containing more than one kind of metal ion.

As represented in FIG. 1, the Co ion-containing liquid after the separation of the Co ion adsorbent in the second step is reused as a Co ion-containing liquid in the first step, and the sequence is repeated after adjusting the Co ion adsorbent and the pH according to the Co ions of the highest concentration from among the remaining metal ions. In this way, the Co ions can be selected and collected in high purity from more than one kind of metal ions.

Collection of Co ions in high purity necessarily requires consideration to exclude other metal ions from the collection liquid in advance.

Co is collected upon heating the collection liquid and evaporating the water. In this way, the Co does not contain any Co ion adsorbent component, and almost all the chemical component used to separate the Co ions evaporate to give Co metal of extremely high purity.

In short, any Co ion adsorbent may be selected and used according to the probes and the material of the HOM, provided that the foregoing conditions are satisfied. In this way, the Co ion adsorbent can return to a state before the adsorption of the Co ions, and can thus be reused.

When not reused, the Co ion adsorbent may be burned to collect the metals. However, this involves inclusion of impurity components from the adsorbent components (e.g., Si) that do not evaporate.

As represented in FIG. 1, the Co ions have been separated from the Co ion adsorbent separated in the fourth step, and the Co ion adsorbent returns to a state before use. Therefore, there is no problem in reusing the Co ion adsorbent by introducing it into the liquid in the first step.

In accord with the foregoing descriptions, the following describes the preparation of preferred Co ion adsorbents for use in the present invention, specific examples of adsorbent properties, and examples of the method for collecting the valuable metal Co from urban ore according to the present invention.

Various symbols and numerals used in the examples are described below.

The same symbols and numerals are used in tables and figures, unless otherwise stated.

The properties and other numerical values in the descriptions of the examples below were determined as follows.
Q: Probe saturation adsorbability (mmol/g)
The saturation adsorbability at probe saturation is determined by the following equation.

$$Q_t = (C_o - C_t) V/m,$$

where $Q_t$ is the adsorbed amount at saturation time t, V is the solution volume (L), m is the HOM carrier mass (g), and $C_o$ and $C_t$ are the initial concentration and the saturation concentration, respectively.
Rt: Probe response time (sec)
Rt is a response time represented by a numerical value obtained from the observation of the successive changes in the color and the ultraviolet•visible absorption spectrum of the probes adsorbing the metal ions.

In the Examples below, UV-Vis spectrometer detection values were used.
$D_L$: Detection limit ($moldm^{-3}$)
The detection limit of probe metal ions is the value calculated from the linear portion of a graph (X axis=bivalent Co, Y axis=A-Ao) representing the calibration measurement result of the spectral absorption (A-Ao) of the probes measured with bivalent Co of different concentrations at a $\lambda_{max}$ value of 534 nm.

Specifically, the detection limit is calculated by the equation $D_L = k_1 S_b/m$, and, when $k_1 = 3$ in determining the detection value, $S_b$ represents the blank standard deviation, m represents the slope of the calibration graph in the linear region.
$L_Q$: Quantification limit coefficient ($moldm^{-3}$)
The detection limit of probe metal ions is the value calculated from the linear portion of a graph (X axis=bivalent Co, Y axis=A-Ao) representing the calibration measurement result of the spectral absorption (A-Ao) of the probes measured with bivalent Co of different concentrations at a $\lambda_{max}$ value of 534 nm.

Specifically, the detection limit is calculated by the equation $L_Q \; D_L = k_2 S_b/m$, and, when $k_2 = 10$ in determining the detection value, $S_b$ represents the blank standard deviation, m represents the slope of the calibration graph in the linear region.
D: Ion diffusion coefficient ($cm^2 min^{-1}$)
The ion diffusion coefficient ($cm^2 min^{-1}$) representing the mobility rate of metal ions for the nanosized porous material is calculated according to the following equation.

$$D = 0.03 r^2 / t_{1/2},$$

where r is the half of the diameter (Dp) of the nanoadsorbent, and $t_{1/2}$ is the half of the reaction signal time Rt
log Ks: Metal ion ligand stability constant
The complex [metal-receptor]$^{n+}$ stability constant (log Ks) at a specific pH value can be calculated according to the following equation.

$$\log K_s = [ML]_s / [L]_s \times [M],$$

where [ML] is the total number of metal ion ligands, [M] is the concentration of the chelate not bound to the metal ions, [L] is the concentration of the probe metal ion ligands not bound to the metal, and S is the sum of the concentrations of the metal ion ligands in the solid stage.

$D_R$: The maximum- and minimum-concentration detection range determined from an ultraviolet spectrum (moldm$^{-3}$)

No*: Number of repeats representing the number of times the adsorbent is used; 1 represents the first use, and 2 or more represents reuse.

Efficiency (E): Efficiency of adsorbent design (%)

The adsorbent can be freely reused, because the adsorbed metal ions can be separated without causing large changes in the structure and property of the adsorbent.

Efficiency (E) is the numerical representation of the changes in the response time ($R_{tn}$) of the adsorbent in the nth use (No*) from the initial response time ($R_{t1}$).

E is calculated according to the following equation.

$$E = R_{tn}/R_{t1} (\%)$$

(S): Molar ratio of metal ions and adsorbent

S=number of moles of metal ions/number of moles of [M-receptor]$^{n+}$ $S_{BET}$: BET specific surface area BET specific surface area is determined by using the nitrogen adsorption method Dp: Pore (fine pore) size (nm)

A central fine pore size calculated by using the BJH method.

Vp: Pore volume (cm$^3$/g)

A volume determined from $S_{BET}$, Dp, and pore shape a*: Unit lattice coefficient The Pm3n, Ia3d and Im3m cubic unit lattice coefficients (nm) are calculated as follows.

$$a_{Pm3n} = d_{210}\sqrt{5},\ a_{Ia3d} = d_{211}\sqrt{6},\ \text{and}\ a_{Im3m} = d_{110}\sqrt{2},$$

where d is the distance spacing between hkl diffraction indices.

[Preparation Example of Co Ion Adsorbent]

<A> Preparation of HOM

Examples of HOM are described below.

The HOM (HOM-1) having the cubic Im3m in 1-01 of Table 1 was synthesized as follows.

Surfactant and Silica Source

The cubic Im3m monolith (HOM-1) in 1-01 of Table 1 was synthesized at a surfactant F108-to-silica source ratio of 0.7, as follows.

F108 (Adeka surfactant; polyoxyethylenepolyoxypropyleneglycol; 1.4 g), dodecane (0.7 g), and TMOS (tetramethyl orthosilicate; 2 g) were placed in a flask, maintained in a 50° C. hot-bath vessel for 1 to 2 min, and dissolved to obtain a transparent solution, specifically a homogeneous solution. Adding alkanes such as dodecane does not change the producing process, and HOM can be produced in a short time period of 5 to 10 min as when alkanes are not added. However, addition of alkanes such as dodecane enables, for example, the pore size of the mesoporous structure to be controlled. Then, a HCl aqueous solution (pH=1.3, about 2 g) was quickly added to the sol-gel solution. Adding the HCl acidic aqueous solution to the composition domain of the homogeneous solution immediately causes TMOS exothermic hydrolysis and condensation. Calcining the product at 450° C. to 500° C. (typically, 470° C.) while vacuuming the flask quickly removes the alcohol component, and yields a semi-transparent HOM monolith. The HOM monolith is a cubic Im3m monolith. Table 1 present various properties (structural parameters).

The monolith (HOM-5) having the cubic Ia3d in 1-02 of Table 1 was synthesized as follows.

The HOM-5 can be produced in the same manner as in the synthesis of the cubic Im3m monolith (HOM-1) in 1-01 of Table 1, using P123, C12-alkane, TMOS, and H$_2$O/HCl at a 0.0198:0.338:1:0.054 ratio. Table 1 presents various properties.

The HOM (HOM-9) having the cubic Pm3n in 1-03 of Table 1 was synthesized as follows.

The HOM-9 can be produced in the same manner as in the synthesis of the cubic Im3m monolith (HOM-1) in 1-01 of Table 1, using Brij56, C12-alkane, TMOS, and H$_2$O/HCl at a 0.112:0.225:1:0.054 ratio. Table 1 presents various properties.

In Table 1, "F108" means an Adeka non-ionic surfactant (polyoxyethylenepolyoxypropyleneglycol), "P123" a BASF non-ionic surfactant (PEO/PPO/PEO triblock copolymer), and "Brij56" an Aldrich non-ionic surfactant (C$_{16}$H$_{33}$(OCH$_2$CH$_2$)$_n$OH, where n is usually 10).

"S/TMOS" in the table represents the mixture ratio of surfactant (S)/TMOS (tetramethyl orthosilicate).

TABLE 1

| | | Si monolith | | | | | | |
|---|---|---|---|---|---|---|---|---|
| | HOM | Synthesis conditions | | | | Structural parameter | | |
| T1No. | type | (s) | S/T MOS | Alkane | T° C. | a* | $S_{BET}$ | $D_p$ | Vp |
| 1-01 | HOM-1 | F108 | 0.7 | Do | 45 | 19.4 | 756 | 8.1 | 1.02 |
| 1-02 | HOM-5 | P123 | 0.75 | Do | 45 | 22.5 | 650 | 6.8 | 1.09 |
| 1-03 | HOM-9 | Brij 56 ® | 0.5 | Do | 45 | 12.3 | 800 | 3.5 | 1.01 |

| | | Mesostructure Analysis | | |
|---|---|---|---|---|
| T1No. | 1) | 2) | 3) | 4) |
| 1-01 | 1 | 13.8 | 1, 1, 0 | (01) |
| | 2 | 9.4 | 2, 0, 0 | Im3m |
| | 3 | 7.4 | 2, 1, 1 | |
| | 4 | 6.6 | 2, 2, 0 | |
| | 5 | 5.9 | 3, 1, 0 | |
| | 6 | 3.69 | 4, 2, 2 | |
| 1-02 | 1 | 9.4 | 2, 1, 1 | (02) |
| | 2 | 8.0 | 2, 2, 0 | Ia3d |
| | 3 | 6.4 | 3, 2, 1 | |

TABLE 1-continued

|  |  |  |  |  |
|---|---|---|---|---|
|  | 4 | 5.3 | 4, 0, 0 |  |
|  | 5 | 4.7 | 3, 3, 2 |  |
| 1-03 | 1 | 6.24 | 2, 0, 0 | (03) |
|  | 2 | 5.59 | 2, 1, 0 | Pm3n |
|  | 3 | 4.9 | 2, 1, 1 |  |
|  | 4 | 3.96 | 3, 1, 0 |  |
|  | 5 | 3.63 | 2, 2, 2 |  |
|  | 6 | 3.5 | 3, 2, 1 |  |
|  | 7 | 3.0 | 4, 0, 0 |  |

(s): Surfactant
Do: Dodecane ($C_{12}$-alkane)
a*: Unit lattice coefficient (nm),
$S_{BET}$: BET surface area ($m^2/g$),
Dp: pore size (nm),
Vp: Pore volume ($cm^3/g$),
Note:
The structural analyses of (1-01), (1-02) and (1-03) were based on the X-ray diffraction data (FIG. 4)
1): Number of peaks
2): Distance spacing (nm)
3): h, k, l (reflection index (hkl))
4): (Cubic) space group <B> Supporting of Co Ion Adsorbing Compound (Probe) on HOM HOM, a silica with highly ordered fine pores, can support various compounds on its surface and on the inner walls of the pores. Thus, probes capable of selectively adsorbing the target metal ions are supported. For example, NN is supported on a cage-shaped or cylindrical cubic monolith as follows. NN is dissolved in anhydrous ethanol (0.01 M/l), and maintained for 10 min at room temperature with 3.5 g of HOM immersed therein. The solution is then heated to 60° C. to impregnate and saturate the HOM with NN in 24 hours. The solid is water washed, and dried at 60° C. for 45 min to remove the ethanol and obtain an NN-supporting HOM-NN. As a result of this procedure, the NN molecules are chemically bonded to the HOM surface and to the pore (fine pore) surfaces on the inner walls via the OH group.

Table 2, corresponding to Table 1, represents the results of supporting the probe NN.

TABLE 2

| Adsorbent | | | | Structural parameter | | | |
|---|---|---|---|---|---|---|---|
| T2No. | T1No. | Probe | Q | a* | $S_{BET}$ | $D_p$ | Vp |
| 2-01 | 1-01 | NN | 0.1 | 19.5 | 700 | 7.9 | 0.97 |
| 2-02 | 1-02 | NN | 0.09 | 23.0 | 613 | 6.6 | 0.99 |
| 2-03 | 1-03 | NN | 0.075 | 12.4 | 770 | 3.3 | 0.93 |

| | Structural analysis | | | |
|---|---|---|---|---|
| T2No. | 1) | 2) | 3) | 4) |
| 2-01 | 1 | 13.8 | 1, 1, 0 | (01) |
|  | 2 | 9.4 | 2, 0, 0 | Im3m |
|  | 3 | 7.4 | 2, 1, 1 |  |
|  | 4 | 6.6 | 2, 2, 0 |  |
|  | 5 | 5.9 | 3, 1, 0 |  |
|  | 6 | 3.69 | 4, 2, 2 |  |
| 2-02 | 1 | 9.1 | 2, 1, 1 | (02) |
|  | 2 | 7.8 | 2, 2, 0 | Ia3d |
|  | 3 | 6.0 | 3, 2, 1 |  |
|  | 4 | 5.4 | 4, 0, 0 |  |
|  | 5 | 4.6 | 3, 3, 2 |  |
| 2-03 | 1 | 6.2 | 2, 0, 0 | (03) |
|  | 2 | 5.6 | 2, 1, 0 | Pm3n |
|  | 3 | 5.0 | 2, 1, 1 |  |
|  | 4 | 3.9 | 3, 1, 0 |  |
|  | 5 | 3.6 | 2, 2, 2 |  |

TABLE 2-continued

|  |  |  |  |
|---|---|---|---|
|  | 6 | 3.3 | 3, 2, 1 |
|  | 7 | 3.1 | 4, 0, 0 |

Note:
1): Number of peaks
2): Distance spacing (nm)
3): h, k, l (reflection index (hkl))
4): (Cubic) Space group

EXAMPLE 1

<1> Adsorption of $Co^{2+}$ by Metal Ion Adsorbents 2-01 to 2-03 of Table 2

$Co^{2+}$ was dissolved in $HNO_3$ solutions to form solutions of various concentrations. Thereafter, NaOH was added to adjust the pH value. The adsorbents of Example 2 were then immersed in the solutions to adsorb the $Co^{2+}$.

Figure 2:
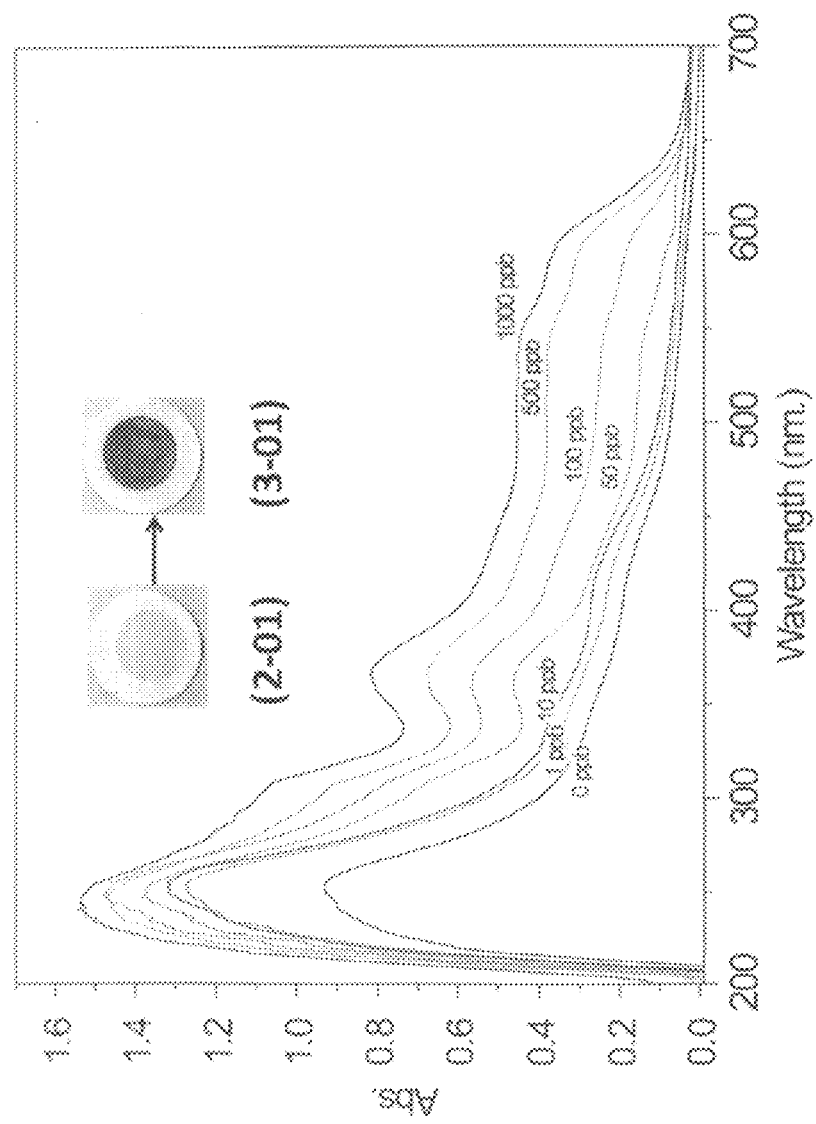
FIG. 2 represents ultraviolet•visible absorption spectra of samples (HOM-NN—$Co^{2+}$) of HOM-NNs (2-01), (2-02), and (2-03) adsorbing $Co^{2+}$ of various concentrations at 20° C. at pH 7. Adsorbent was used in 5.0 mg for efficient color change and spectral reaction; solution volume of each sample, 10 ml.

FIG. 2 is a diagram representing the ultraviolet•visible absorption spectra of samples in which the adsorbents 2-01 to 2-03 (hereinafter, collectively referred to as "HOM-NNs") were used to adsorb $Co^{2+}$ of various concentrations at pH 7.

The HOM-NNs were immersed in constant amounts (5 mg) to optimize the colorimetric analysis and spectral response. The solution volume was held constant at 10 ml. The absorption spectral analysis was performed with an ultraviolet•visible solid spectrophotometer (Model 3700, Shimadzu).

As can be seen from FIG. 2, the amount of spectral absorption increases with increase in $Co^{2+}$ amounts. Conversely, the $Co^{2+}$ amounts can be estimated from the spectrum.

Figure 3:
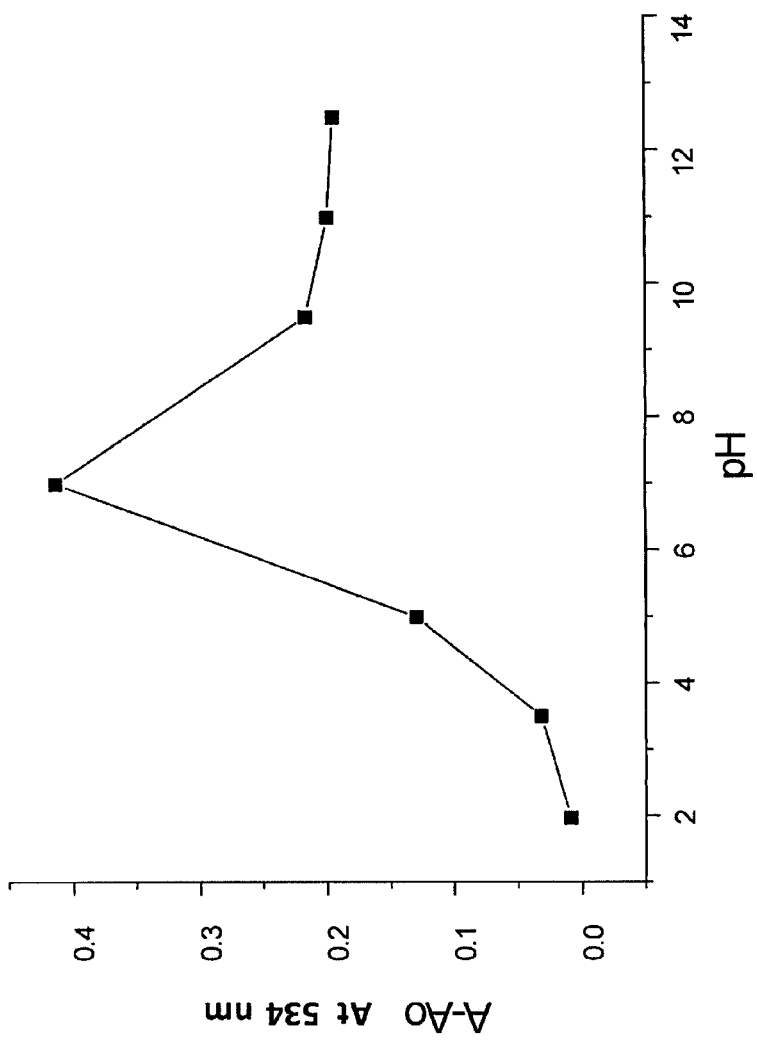
FIG. 3 is a diagram representing the relationship between $A-A_0$ (a difference between A and $A_0$) and pH value for the powder adsorbent (2-01) that adsorbed $Co^{2+}$ [0 and 1,000 ppb] at various pH values, and that was subjected to ultraviolet•visible absorption spectral measurements to determine absorption amounts ($A_0$ and A) from the resulting absorption spectra at 534 nm wavelength. The pH investigation was performed for a (2-01) NN-sensor after adding $Co^{2+}$ [1 ppm]. All measurements were recorded on UV-Vis. reflectance spectra after equilibrating the powder adsorbent (2-01) and $Co^{2+}$ at the same pH value for 1 min.

FIG. 3 is a diagram representing the relationship between $A-A_0$ (a difference between A and $A_0$) and pH value for the HOM-NN that adsorbed $Co^{2+}$ [0 and 1,000 ppb (1 ppm)] at various pH values, and that was subjected to ultraviolet•visible absorption spectral measurements to determine absorption amounts ($A_0$ and A) from the resulting absorption spectra at 534 nm wavelength. It can be seen from the diagram that the highest $Co^{2+}$ adsorption by the HOM-NN occurs when the HOM-NN is maintained in a solution with a pH of about 7. Considering variations in the measurement results, the HOM-NN has the highest $Co^{2+}$ adsorption efficiency when maintained at pH=6 to 9, preferably pH=6 to 8, more preferably pH=6.5 to 7.5. Note that the HOM-NN after adsorbing $Co^{2+}$ turns brown in color from yellow, and the brown color becomes thicker as more $Co^{2+}$ is adsorbed. The extent of the $Co^{2+}$ adsorption by the adsorbent can thus be found by visual inspection. The adsorbents of Example 2 can thus be used also as $Co^{2+}$ adsorbents.

Figure 4:
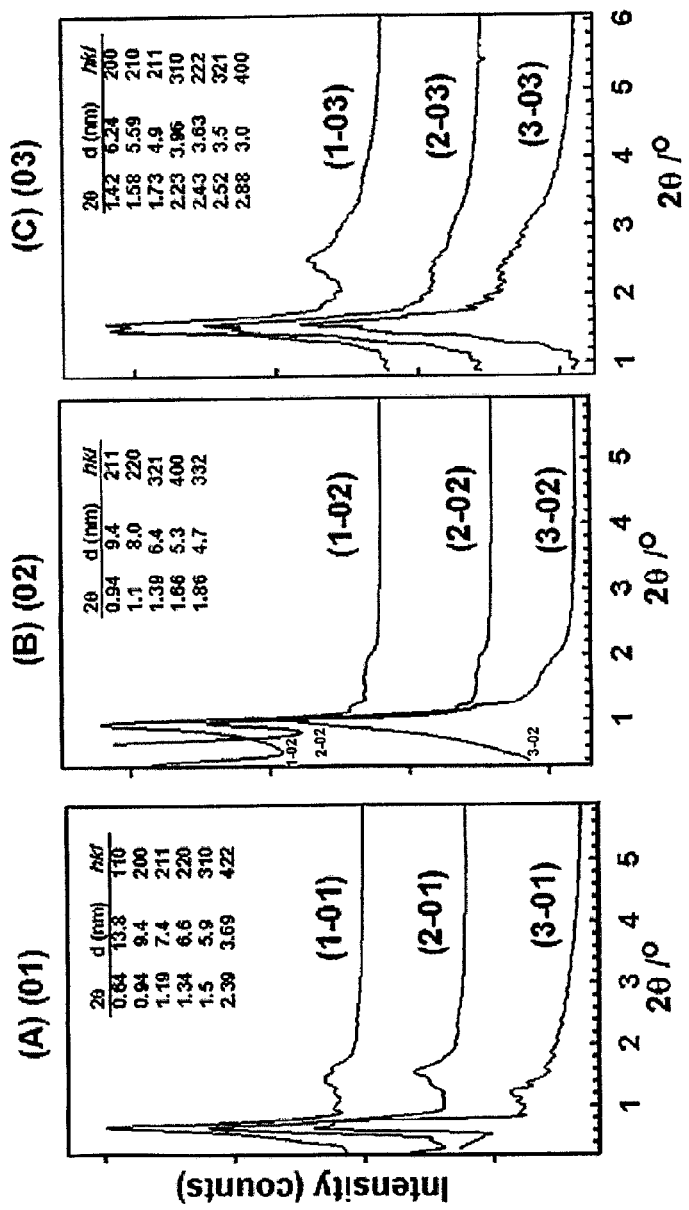
FIG. 4 is a diagram representing powder X-ray diffraction measurement (XRD) data for adsorbents and $Co^{2+}$ adsorption using HOMs of the Im3m (A), Ia3d (B), and Pm3n (C) mesostructures.

FIG. 4 represents powder X-ray diffraction measurement (XRD) data for HOM-NNs that were immersed in a 1-ppm $Co^{2+}$ solution and adsorbed $Co^{2+}$. The three curves (a), (b), and (c) in FIGS. 4(A), (B), and (C) correspond to 1-01 to 1-03, 2-01 to 2-03, and 3-01 to 3-03, respectively. It can be seen from these diagrams that the HOM, regardless of the ordered structure, does not show notable changes in its highly ordered structure even in the microscopic sense, despite the NN supported on the surface in high density. These data thus also demonstrate that the adsorbents can be reused.

Table 3 summarizes the results from nitrogen adsorption isotherm and XRD for HOM-NNs that have adsorbed $Co^{2+}$ in a 1-ppm $Co^{2+}$ solution.

Q is the probe saturation adsorbability (mmol/g), $D_R$ the maximum- and minimum-concentration detection range ($\mu M$) determined from the spectrum, DL is the $Co^{2+}$ detection limit ($\mu M$), Rt is the adsorbent response time (sec), $S_{BET}$ is the BET specific surface area, D is the pore (fine pore) size (nm), and Vp is the pore volume ($cm^3/g$).

In the results presented in Table 3, $Co^{2+}$ was adsorbed using three kinds of HOM-NN adsorbents of Table 2. In the table, adsorbability (Qmmol/g), and adsorption limit concentration ($D_L \mu M$) are presented.

As is clear from these results, the HOM does not undergo structural changes before and after the probe binding, and even after adsorbing the metal ions.

Further, the measured data for the adsorption response speed ($R_t$) in Table 3 made it clear that adsorbability does not change greatly even after the repeated use.

<2> Collection of Co from Urban Ore

An urban ore (1 g) was immersed in a 50% $HNO_3$ nitric acid aqueous solution (40 ml), and maintained for 8 hours while being agitated under heat in a 70 to 80° C. temperature range. The aqueous solution was filtered, and the residues were removed by washing with hot water to produce a 70-ml filtrate (solution 1). The residues were plastics (0.4 g). After adding 5 moles of sodium citrate (20 ml) to the solution 1, the solution was maintained at pH 7 by gradually adding NaOH. As a result, brown precipitates were formed (precipitate A). The solution was filtered, and the precipitate was water washed to obtain a 200-ml filtrate (solution 2). It was confirmed that the precipitate A contained Fe and Cu, but hardly any Co. That is, the total amount of metal ions other than Co is much smaller in solution 2 than in solution 2. Here, significant amounts of metal ions other than Co are removed to increase the relative proportion of the Co amount in solution 2. In this way, more Co can be adsorbed upon immersing the HOM-NN in solution 2. Note that the adjusted pH value of solution 1 is preferably 6 to 8, more preferably 6.5 to 7.5, optimally 7.0.

Thereafter, the adsorbent HOM-NN (1.1 g) of Table 2 is introduced into the solution, and the solution was agitated for 2 hours.

The HOM-NN that has adsorbed the metal ions is filtered, and water washed. It was confirmed that hardly any $Co^{2+}$ was present in the filtrate (solution 3). Specifically, almost all $Co^{2+}$ was adsorbed by the HOM-NN. The HOM-NN that has adsorbed the metal ions was then immersed in a 2 M (molar) HCl aqueous solution (100 ml), and agitated for 1 hour. The HOM-NN was then filtered, and water washed.

It was confirmed that hardly any $Co^{2+}$ was present in the filtrate (solution 4), though Fe and Cu were present. As a result of this procedure, almost all of the metal ions adsorbed on the HOM-NN are Co. Then, the HOM-NN was immersed in a 10 molar $H_2SO_4$ solution (50 ml), stirred, and filtered to obtain a filtrate (solution 5). Analysis of the solid by X-ray diffraction confirmed that there was no change in the HOM-NN structure.

It was also confirmed that Co, but not other metal ions, was present in solution 5. Specifically, in this Example, $Co^{2+}$ was selectively adsorbed by HOM-NN, and was separated from the HOM-NN separated and collected from the liquid. Further, the same experiment conducted with a reused HOM-NN confirmed that the HOM-NN can be used repeatedly.

As described above, probes such as chelate compounds that selectively adsorb the target metal Co ions are supported on a highly ordered HOM silica produced from an organosilicon compound and a surfactant, the HOM silica supporting the probes is then contacted with a solution dissolving the target metal Co ions to selectively adsorb the target Co metal ions on the probes supported on the HOM silica. The HOM silica supporting the probes adsorbing the target Co metal ions is then chemically treated to liberate the target Co metal ions from the probes supported on the HOM silica. The target metal Co ions can be collected in this way. The HOM silica supporting the probes from which the target metal ions were liberated can then be reused.

The chemical used for the separation dissipates, for example, by being decomposed while heating the collection liquid. Thus, the use of the chemical for the selective collection of the Co ions does not pose any problem.

The Co ion collection method can be summarized as a method of collecting Co ions with a metal-ion adsorbent for which a HOM silica supporting the chelate compound 2-nitroso-1-naphthol is used and that is introduced after adjusting the liquid pH to 7 in the first step for the selective collection of $Co^{2+}$.

Incidentally, by the heat evaporation of the solution 5, Co metal was collected.

It was confirmed that Co metal ions could also be selectively collected by performing the procedures of the foregoing example for the Co metal ion collection method in which the adsorbent is introduced for the collection of Co metal ions using various chelate compounds.

EXAMPLE 2

A Co ion collection experiment was conducted as in Example 1. A Co ion adsorbent including the chelate compound pyrogallol red supported on a HOM silica was used in the first step, and the Co metal ion adsorbent was introduced after adjusting the liquid pH to 3.5. As a result, the Co metal ions were selectively collected.

EXAMPLE 3

A Co ion collection experiment was conducted as in Example 1 by performing a Co metal ion collection method in which a Co ion adsorbent including the chelate compound 8-(4-n-dodecyl-phenylazo)-quinoxaline (DPAQ) supported on a HOM silica is used in the first step, and in which the Co metal ion adsorbent is introduced after adjusting the liquid pH to 5. The Co metal ion adsorbent was introduced after adjusting the liquid pH to 5, and the solution was stirred for 2 hours.

Then, the Co metal ion adsorbent was removed, and immersed in a $H_2SO_4$ solution (50 ml). The solution was stirred, and filtered to obtain a filtrate. The filtrate was then treated to evaporate under heat to separately collect the Co metal. Example 3 demonstrates the effectiveness of the following method.

In the metal Co ion collection method for selectively collecting Co ions, a Co metal ion adsorbent including the chelate compound 8-(4-n-dodecyl-phenylazo)-quinoxaline (DPAQ) supported on a HOM silica is used in the first step, and the Co metal ion adsorbent is introduced after adjusting the liquid pH to 5.

TABLE 3

| T3No. | T2 No. | adsorptive feature | | | |
|---|---|---|---|---|---|
| | | $D_L$(mol dm$^{-3}$) | $D_R$(mol dm$^{-3}$) | $R_t$ | pH |
| 3-01 | 2-01 | $13.57 \times 10^{-9}$ | $1.6 \times 10^{-8}$ to $1.69 \times 10^{-8}$ | 30 | 7 |
| 3-02 | 2-02 | $15.27 \times 10^{-9}$ | $1.6 \times 10^{-8}$ to $1.35 \times 10^{-8}$ | 35 | 7 |
| 3-03 | 2-03 | $16.95 \times 10^{-9}$ | $1.6 \times 10^{-8}$ to $0.84 \times 10^{-8}$ | 35 | 7 |

| T3No. | Featured with Reuse Cycles | | | |
|---|---|---|---|---|
| | Collection liquid | No.* | $R_t$ | E |
| 3-01 | HNO$_3$/H$_2$SO$_4$ | 2 | 40 | 99 |
| | | 4 | 60 | 95 |
| | | 6 | 120 | 92 |
| 3-02 | HNO$_3$/H$_2$SO$_4$ | 2 | 60 | 98 |
| | | 4 | 80 | 97 |
| | | 6 | 150 | 95 |
| 3-03 | HNO$_3$/H$_2$SO$_4$ | 2 | 60 | 98 |
| | | 4 | 120 | 95 |
| | | 6 | 180 | 93 |

Table 3 represents the results of Co$^{2+}$ adsorption on the three kinds of HOM-NN adsorbents (3-01, 3-02, 3-03) of Table 2 in a solution dissolving 1-ppm Co ions.

$D_R$ is the maximum- and minimum-concentration detection range (μM) determined from the spectrum, DL is the Co$^{2+}$ detection limit (μM), and Rt is the adsorbent response time (sec).

The invention claimed is:

1. A method for selectively collecting Co from an urban ore containing Co obtained by comminuting an electronic device waste,
the method comprising:
a first step of immersing the urban ore in a nitric acid aqueous solution to elute the Co metal contained in the urban ore, and mixing a Co ion adsorbent for adsorbing collection target Co ions with the resulting Co ion-containing liquid;
a second step of separating the Co ion adsorbent from the liquid after the Co ions are adsorbed;
a third step of introducing the Co ion adsorbent separated in the second step into a collection liquid that does not contain Co ions, and separating and releasing the Co ions into the collection liquid;
a fourth step of separating the Co ion adsorbent from the collection liquid after the Co ions are released; and
a fifth step of evaporating the collection liquid from which the Co ion adsorbent is removed in the fourth step, so as to collect the Co ions contained in the collection liquid,
wherein the Co ion adsorbent mixed with the Co ion-containing liquid in the first step comprises a support having a continuously porous mesoporous monolith structure formed of large numbers of pores of substantially uniform size and shape; and a compound that has a metal ion-binding group and is chemically bound to inner surfaces of the pores, and
wherein the compound that has a metal ion-binding group is pyrogallol red or 8-(4-n-dodecyl-phenylazo)-quinoxaline (DPAQ).

2. The method for collecting Co from an urban ore according to claim 1, wherein the Co-ion adsorbent separated from the collection liquid in the fourth step is reused as a Co-ion adsorbent in the first step.

3. The method for collecting Co from an urban ore according to claim 1, wherein the Co ion-containing liquid used in the first step is one after the separation of the Co ion adsorbent in the second step and in which the Co ions still remain.

4. The method for collecting Co from an urban ore according to claim 1, wherein the support and the compound are bound to each other via a OH group.

5. The method for collecting Co from an urban ore according to claim 1, wherein the support is a HOM silica having a high-order porous structure.

6. The method for collecting Co from an urban ore according to claim 2, wherein the Co ion-containing liquid used in the first step is one after the separation of the Co ion adsorbent in the second step and in which the Co ions still remain

* * * * *